United States Patent
Meyer

(10) Patent No.: US 6,329,079 B1
(45) Date of Patent: Dec. 11, 2001

(54) LINED ALLOY TUBING AND PROCESS FOR MANUFACTURING THE SAME

(75) Inventor: John J. Meyer, St. Louis County, MO (US)

(73) Assignee: Nooter Corporation, St. Louis, MO (US)

( * ) Notice: Subject to any disclaimer, the term of this patent is extended or adjusted under 35 U.S.C. 154(b) by 0 days.

(21) Appl. No.: 09/429,740

(22) Filed: Oct. 27, 1999

(51) Int. Cl.[7] ............... B32B 1/08; B32B 15/18; F16L 9/14; B21C 23/22
(52) U.S. Cl. ............ 428/679; 72/370.01; 72/370.02; 72/700; 138/142; 138/143; 148/519; 148/529; 148/534; 164/91; 164/98; 165/180; 219/609; 219/610; 228/126; 228/131; 428/586; 428/680; 428/682; 428/941
(58) Field of Search .................. 428/586, 679, 428/680, 682, 941; 138/142, 143; 148/519, 529, 534; 29/458, 527.7, DIG. 49; 72/370.01, 370.02, 700; 164/91, 98; 165/180; 219/609, 610; 228/126, 131

(56) References Cited

U.S. PATENT DOCUMENTS

| | | | |
|---|---|---|---|
| 4,162,758 | * 7/1979 | Mikarai | 428/679 |
| 4,463,061 | * 7/1984 | Otoguro et al. | 138/143 |
| 4,685,427 | * 8/1987 | Tassen et al. | 138/143 |

* cited by examiner

*Primary Examiner*—Robert R. Koehler
(74) *Attorney, Agent, or Firm*—Polster, Lieder, Woodruff & Lucchesi, L.C.

(57) ABSTRACT

A tube for a cracker unit in which ethylene is produced withstands, without oxidizing or losing its strength, the elevated temperatures required to effect cracking, yet retards coking. The tube has a shell formed from stainless steel or high nickel alloy and a liner formed from an iron-aluminum alloy. The liner retards the deposit of carbon and its build up known as coking. To form the tube, a high alloy ingot is bored to provide a bore that extends through its center. Then a weld overlay is applied to surface of the bore, with the overlay being derived from a weld metal containing at least 16% aluminum and the balance essentially iron. Thereafter, the ingot is heated to its hot working temperature and extruded through sets of opposed rollers, with the direction of advance being in the direction of the bore. The extruding transforms the ingot into a lined tube.

15 Claims, 2 Drawing Sheets

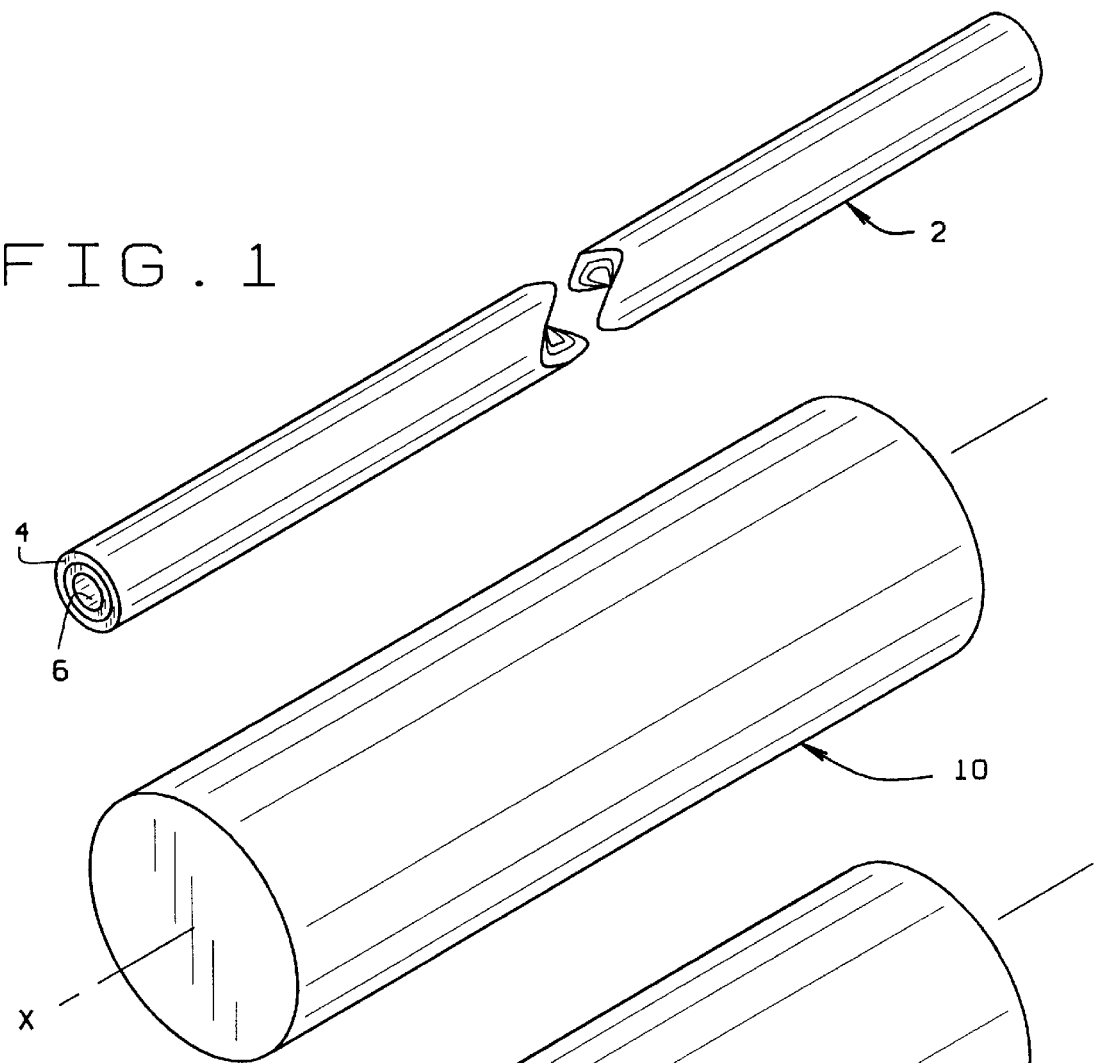
FIG. 1
FIG. 2
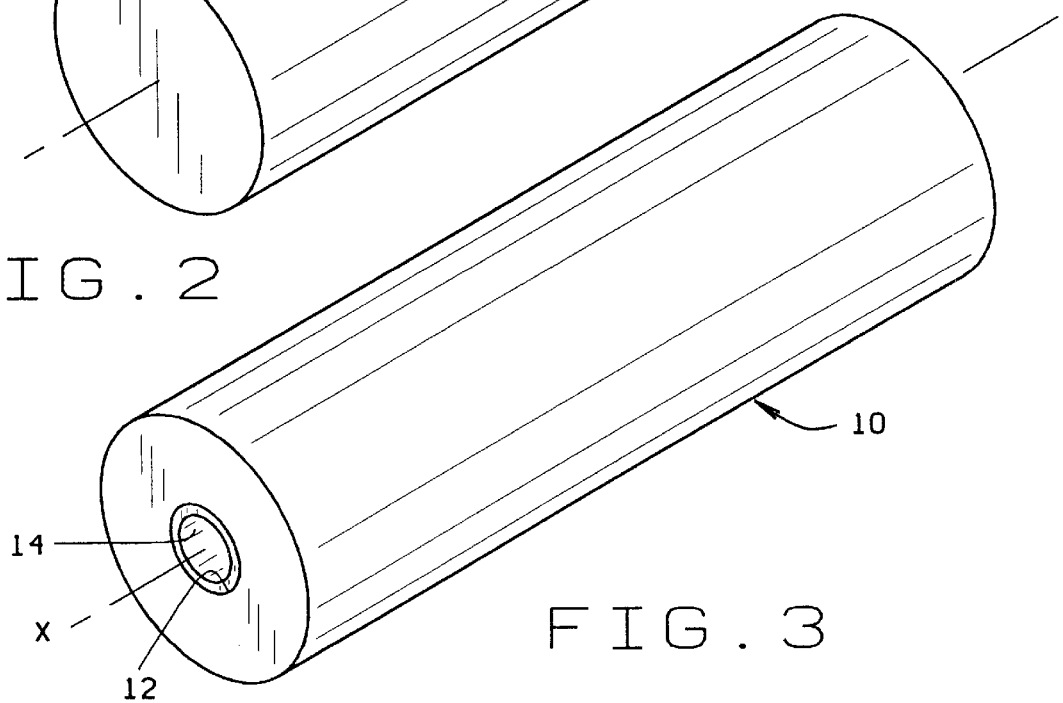
FIG. 3

LINED ALLOY TUBING AND PROCESS FOR MANUFACTURING THE SAME

BACKGROUND OF THE INVENTION

This invention relates in general to alloy tubing and, more particularly, to high strength alloy tubing which is lined to retard coking and to a process for manufacturing such tubing.

Petroleum refineries produce a wide variety of products from petroleum feedstock, much of it by cracking, that is to say, by subjecting complex hydrocarbons to elevated temperatures in order to break them down into hydrocarbons of less complexity. Eythylene ($C_2H_4$) is one product that is typically produced by cracking. To produce ethylene, a suitable feedstock is introduced into a cracking unit having multiple tubes formed from stainless steel, each with an inside diameter of about 4 inches and a length of up to 40 feet. The tubes are heated to between 1600° F. and 1700° F. As the feedstock passes through the tubes, it breaks down into ethylene and other less complex hydrocarbons.

The stainless steel of the tubing retains its strength at the elevated temperatures and further resists oxidation. In that sense, the stainless steel, which is typically 310 stainless steel, is well suited for the tubes of the cracking unit. But the nickel in the stainless steel, and to a measure the iron as well, serve as catalysts for the dehydrogenation of the hydrocarbons in the tubes. As a consequence, carbon deposits on the inside surfaces of the tubes. The initial layer of carbon promotes further deposits of amorphous carbon in the form of coke. The phenomenon is known as coking.

Coking reduces the inside diameter of the tubes, and that results in a greater pressure drop through the tubes. The coke also functions as thermal insulation where none is needed or wanted. As a consequence, the external temperatures of the tubes must be elevated to effect sufficient heat transfer. Moreover, where stainless steel serves as the alloy, the chromium within it exhibits an affinity for carbon and, indeed, some of it unites with the carbon deposits to form carbides. This not only reduces the capacity of the stainless steel to resist corrosion, but also renders it brittle and less capable of withstanding stresses.

Coking represents a serious problem for the operators of cracking units that produce ethylene. Periodically, the operator of a cracking unit must take the unit off line, disassemble it, and physically remove the coke from the interiors of the tubes in the unit. This time-consuming procedure sometimes must be repeated at six to ten day intervals.

An iron-aluminum alloy containing about 22% aluminum by weight resists coking quite well, and those who design cracker units know this. But the iron-aluminum alloy lacks strength at the elevated temperatures to which the tubing of cracker units is subjected, and hence, does not find use for such tubing.

BRIEF SUMMARY OF THE INVENTION

The present invention resides in a tube having a shell formed from stainless steel or high nickel alloy and a liner that is high in aluminum content, with the liner being fused to the shell by welding. The invention also resides in the method of producing the tube. Using that method a stainless steel or high nickel alloy ingot is bored and then a weld overlay is applied to the ingot along the surface of its bore, with the metal that is added to form the overlay having between 16% and 30% aluminum and preferably about 22% aluminum. The ingot is then extruded in the direction of its bore to transform it into a tube. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur;

FIG. 1 is a perspective view of a heat exchanger tube constructed in accordance with and embodying the present invention;

FIG. 2 is a perspective view of an ingot from which the shell of the tube is derived;

FIG. 3 is a perspective view of the ingot after having been bored and the surface of the bore covered with a weld overlay;

DETAILED DESCRIPTION

Figure 4:
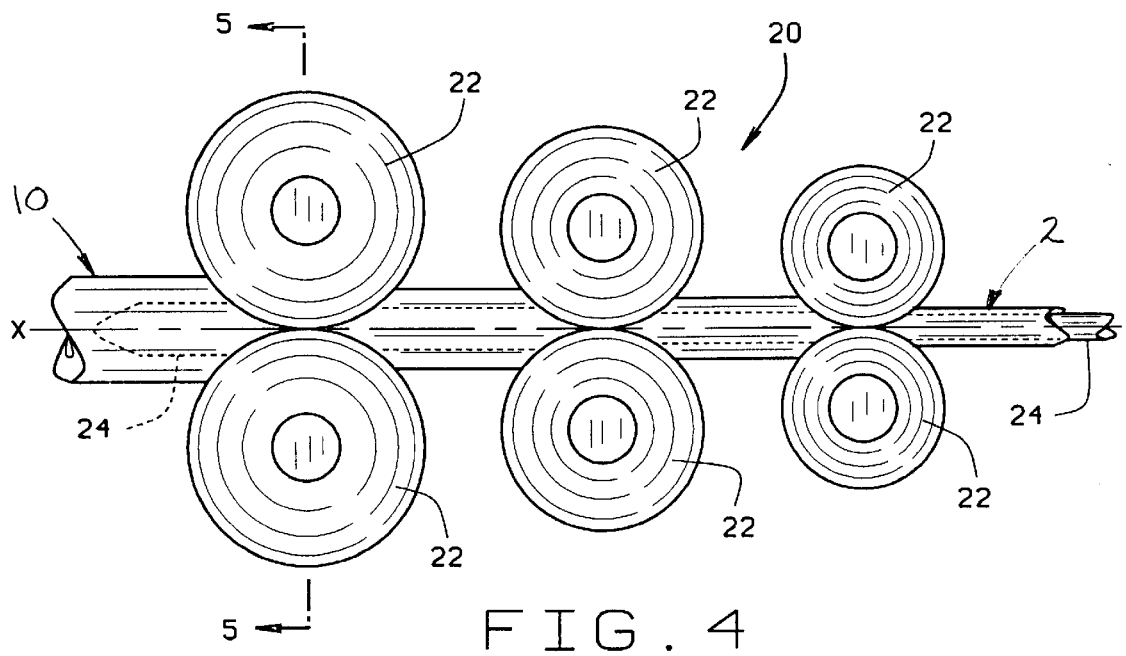
FIG. 4. is a schematic view of the apparatus for extruding the bored ingot and weld overlay into a tube.

Referring now to the drawings, a tube 2 (FIG. 1) is well-suited for use as a component of a heat exchanger—indeed, as a component through which heat is transferred from one fluid to another. The heat exchanger may be a cracking unit for converting petroleum feedstocks containing complex hydrocarbons into less complex hydrocarbons, such as ethylene and other olefins. The tube 2 has the capacity to withstand the high temperatures identified with cracking petroleum, all without losing strength or oxidizing. It also retards the deposit and build up carbon within its interior—a phenomenon known as coking. To this end, the tube 2 has a shell 4 of considerable thickness and a thin liner 6 forming its interior surface. The shell 4 is exposed to a source of heat, such as hot gases, and is capable of retaining its strength and resisting oxidation at the temperature of the gases. The liner 6, on the other hand, is exposed to the petroleum feedstock and the hydrocarbons derived from it as a result of the cracking produced by the heat.

Preferably the shell 4 is formed from 310 stainless steel, which is an iron alloy that basically contains, by weight, 25% chromium, 20% nickel and the balance essentially iron. Other stainless steels of greater chromium and nickel content will also suffice. So will high nickel alloys which typically contain over 50% nickel and less than 5% iron, Inconel 803, which is available from Special Metals Corporation of Huntington, W.V., International Nickel Company, being one such alloy. Basically, the alloy of the shell 4 should withstand temperatures on the order of 1600–1700° F. without losing strength and without oxidizing. Typically, the shell 4 has an exterior diameter of about 1½ inches and an interior diameter of about 2 inches. Its length may be up to about 40 feet.

The liner 6 is preferably derived from an iron-aluminum alloy—one having between 16% and 30% aluminum by weight and preferably about 22% aluminum by weight, with the balance being essentially iron. It is fusion bonded to the shell 4 by welding. The fusion blends the metal of the shell 4 with the iron-aluminum alloy that is added to form the liner 6, so the aluminum content of the liner 6 does not correspond precisely with that of the weld metal, that is to say with the iron-aluminum alloy. The thickness of the liner 6 ranges between ⅛ and ⅜ inches.

The manufacture of the tube 2 begins with a cylindrical ingot 10 (FIG. 2) of stainless steel or other suitable alloy having a length of about 30 inches and a diameter of between 6¾ and 9 inches. The ingot 10 may be derived by forging or casting. Using a drill, the ingot 10 is provided with a bore 12 (FIG. 3) which extends axially through the ingot 10 along its centerline or axis X. The bore 12, which extends completely through the ingot 10, has a uniform diameter ranging between 2¾ and 3 inches.

Using an internal bore welder, the ingot 10 is provided with a weld overlay 14 (FIG. 3) along the surface of the bore 12, with the overlay 14 being derived from a metal weld that will produce the desired composition for the liner 6 in the tube 2, that is to say from a weld wire that contains between 16% and 30% aluminum by weight, and preferably about 22% aluminum, with the balance being essentially iron. Being a weld, the overlay fusion bonds to the alloy of the ingot 10, and the alloy of the ingot 10 to a measure blends with the iron-aluminum alloy of the overlay 14. Thus, the constituency of the overlay 14 does not correspond precisely with that of the weld metal. The thickness of the overlay 14 should range between ⅛ and ⅜ inches. Suitable welding procedures for applying the overlay include gas tungsten arc welding (GTAW), gas metal arc welding (GMAW), plasma arc welding (PAW), and lasar welding.

Once the ingot 10 is provided with the bore 12 and the overlay 14, the ingot 10 is heated to its hot working temperature on the order of at least 2300° F., at which temperature it is somewhat plastic. Then, while the ingot 10 is at the hot working temperature, it is extruded in the direction of its X axis by passing it through an extruding machine 20 (FIG. 4). This elongates the ingot 10 and converts it into the tube 2.

Figure 5:
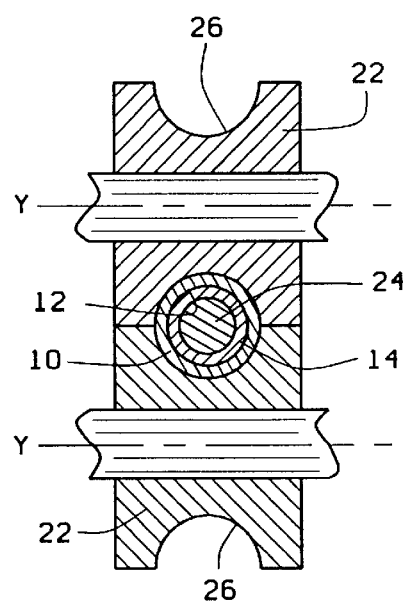
FIG. 5 is a sectional view taken along line 5—5 of FIG. 4.

The extruding machine 20 has a succession of rollers 22 which are arranged in pairs and a mandrel 24 that is extended between the rollers 22 of the several pairs. The rollers 22 of each pair are equal in diameter and cross-sectional configuration. Each roller 22 of pair revolves about its own axis Y which is parallel to the axis Y of the other roller 22 in the pair. Each roller 22 has a half-circular working surface 26, so in cross section the working surfaces 26 for the rollers 22 of any pair form a circle (FIG. 5). The circles so formed become progressively smaller through the succession of rollers 22. While the diameter of the circle formed by the first pair of rollers 22 is only slightly smaller than the diameter of the ingot 10, the diameter of the circle for the smallest set of rollers 22 corresponds to the diameter of the shell 4 for the tube 2. The outside diameter of the mandrel 24 initially corresponds to the inside diameter of the overlay 14 in the ingot 10, but from there tapers downwardly to the inside diameter desired for the tube 2, it being at that diameter in the region of the smallest pair of rollers 22.

The ingot 10 containing the overlay 14, while at its hot working temperature, enters the circular space or nip between the largest pair of rollers 22 where the half-circular working surfaces 26 of those rollers 22 bear against the exterior surface of the ingot 10. The overlay 14 on the interior of the bored ingot 10, on the other hand, passes over the mandrel 24. The rollers 22 of the first pair at their working surfaces 26 grip the ingot 10 and advance it, reducing its diameter and elongating it in so doing. The rollers 22 of the first pair advance the ingot 10 to the next pair of rollers 22 where another reduction in diameter and a further elongation occurs. The procedure repeats with each succeeding pair of rollers 22 which usually number in excess of those illustrated. As the ingot 10 passes through the rollers 22 of the several pairs, it also passes over the mandrel 24, which maintains the interior surface of the ingot 10, which surface lies along the overlay 14, uniform and free of discontinuities. When the ingot 10 emerges from the final pair of rollers 22, it possesses a smooth outer surface having a diameter corresponding to that of the shell 4 for the tube 2 and a smooth inside surface, the diameter of which corresponds to the inside diameter for the liner 6 of the tube 2. Indeed, the ingot 10 emerges from the final pair of rollers 22 as the tube 2.

While still at its hot working temperature the tube 2 may be bent into a configuration, such as serpentine, which is suitable for a heat exchanger.

In use in a heat exchanger, such as a cracking unit, the tube 2 has the strength to withstand the stresses imposed by high internal pressures and by thermal expansion, notwithstanding the elevated temperatures at which it operates. It also retards the deposit of carbon along its interior surface, which is actually the liner 6, so that coking, while it may occur, requires considerably more time to render the tube 2 unsuitable for cracking. Aluminum is particularly resistant to carbon deposits, and the aluminum in the liner 6 imparts a good measure of coking resistance to the liner 6 which is of course the interior of the tube 2. The iron within the liner 6 renders it compatible with the alloy of the shell 4 in the sense that the two can be joined by welding. Owing to its resistance to coking, the tube 2 may have a diameter less than the tubes of conventional cracker units, and this reduces the amount of expensive alloy in the cracker unit.

EXAMPLES

An ingot 10 having shell 4 formed from 310 stainless steel possessed an outside diameter 9.0 inches and a length of 30.0 inches. A boring procedure left the ingot 10 with a bore 12 having a diameter of 3.0 inches. Using an internal bore welder into which a weld wire formed from an iron-aluminum alloy consisting of 22% aluminum and the balance iron was fed, an overlay 14 was applied to the surface of the bore 12. The overlay 14 possessed a thickness of ⅜ inches. After passing through the extruding machine 20 at the hot working temperature, the ingot 10 emerged as a tube having a 2¾ inch outside diameter, a ⅜ inch wall, and a 40 foot length. The overlay 14 transformed into a liner 6 that was 0.035 inches thick.

Another ingot 10, likewise formed from 310 stainless steel, had an outside diameter of 6¾ inches and a length of 30 inches. It was provided with a 3.0 inch bore 12 and along the surface of the bore 12 with a ⅜ inch thick overlay 14 derived from an iron-aluminum weld wire having 22% aluminum and the balance iron. The ingot 10 was extruded into a tube 2 having a 2 inch outside diameter, a ¼ inch wall thickness and a 40 foot length. The liner 6 in the tube had a thickness of 0.045 inches.

Of course, the process will produce tubes 2 of different dimensions.

What is claimed is:

1. A method of forming a tube which can withstand elevated temperatures and resists coking, said method comprising: providing an ingot which is formed from a stainless steel or high nickel alloy with a bore that extends through the ingot; welding an overlay to the ingot along the surface of the bore, with the overlay being derived from a weld metal containing at least about 16% aluminum by weight; and thereafter extruding the ingot to elongate it in the direction of the bore, whereby the ingot transforms into a lined tube.

2. A method according to claim 1 and further comprising heating the ingot, before it is extruded, to its hot working temperature, and commencing the extruding while the ingot is at the hot working temperature.

3. A method according to claim 1 wherein the weld metal from which the overlay is derived contains between about 16% and about 30% aluminum.

4. A method according to claim 1 wherein the balance of the weld metal from which the overlay is derived is essentially iron.

5. A method according to claim 1 wherein the overlay is derived from a weld wire containing by weight about 22% aluminum and the balance essentially iron.

6. A method according to claim 1 wherein the ingot is extruded by passing it between opposed rollers having working surfaces that are half-circular in cross section.

7. A method according to claim 1 wherein the ingot is generally cylindrical in configuration.

8. A method according to claim 1 and further comprising passing the ingot over a mandrel as it is extruded.

9. A tube for use in a cracking unit for producing olefins from a petroleum feedstock, said tube comprising: a shell formed from a stainless steel or a high nickel alloy; and a liner within the shell, the liner being derived from an alloy containing, by weight, at least 16% aluminum and the balance essentially iron, the liner being welded to the shell.

10. A method of forming a tube which retains its strength and resists oxidation at elevated temperatures and further retards coking within its interior, said method comprising: providing a cylindrical ingot which is formed from a metal selected from a group consisting of stainless steel and high nickel alloy; boring a hole through the ingot; welding an overlay to the ingot along the surface of the hole for the full circumference of the hole, with the overlay being derived from a weld metal containing by weight at least 16% aluminum; heating the ingot to its hot working temperature; while the ingot is at its hot working temperature, extruding the ingot to reduce its diameter and increase its length.

11. A method according to claim 10 wherein the balance of the weld metal from which the overlay is derived is essentially iron.

12. A method according to claim 11 wherein the step of extruding the ingot includes passing the ingot between the opposed working surfaces of at least one set of rollers, with direction of advance being generally parallel to the hole, the spacing between the opposed working surfaces being less than the diameter of the ingot, whereby the ingot transforms into a lined tube.

13. A method according to claim 11 and further comprising: passing the ingot over a mandrel which extends into the hole of the ingot as the ingot is extruded.

14. A method according to claim 11 wherein the ingot is formed from stainless steel having at least 25% chromium by weight and 20% nickel by weight.

15. A method according to claim 11 wherein the ingot is formed from high alloy nickel having at least 50% nickel by weight and less than 5% iron by weight.

* * * * *